(12) United States Patent
Bansal et al.

(10) Patent No.: US 11,860,768 B1
(45) Date of Patent: Jan. 2, 2024

(54) SYSTEM AND METHOD OF AUTOMATED QUALITY ASSURANCE AND PERFORMANCE TESTING FRAMEWORK

(71) Applicant: Blue Yonder Group, Inc., Scottsdale, AZ (US)

(72) Inventors: Ankit Bansal, Mississauga (CA); Venkata Nagendra Prasad Atluri, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 16/213,071

(22) Filed: Dec. 7, 2018

Related U.S. Application Data

(60) Provisional application No. 62/665,674, filed on May 2, 2018.

(51) Int. Cl.
| | |
|---|---|
| *G06F 11/36* | (2006.01) |
| *G06Q 10/08* | (2023.01) |
| *G06F 17/18* | (2006.01) |
| *G06F 11/34* | (2006.01) |
| *G06F 3/0481* | (2022.01) |

(52) U.S. Cl.
CPC ........ *G06F 11/3684* (2013.01); *G06F 3/0481* (2013.01); *G06F 11/3466* (2013.01); *G06F 11/368* (2013.01); *G06F 11/3664* (2013.01); *G06F 11/3668* (2013.01); *G06F 11/3688* (2013.01); *G06F 11/3692* (2013.01); *G06F 17/18* (2013.01); *G06Q 10/08* (2013.01)

(58) Field of Classification Search
CPC .............. G06F 11/368; G06F 11/3684; G06F 11/3664; G06F 11/3688; G06F 11/3668; G06F 3/0481; G06F 11/3692; G06F 11/3466; G06F 17/18; G06F 11/3676; G06F 11/3696; G06F 16/289
See application file for complete search history.

(56) References Cited

U.S. PATENT DOCUMENTS

| | | | |
|---|---|---|---|
| 6,408,403 B1 * | 6/2002 | Rodrigues ........... | G06F 11/3688 714/E11.21 |
| 2003/0058277 A1 * | 3/2003 | Bowman-Amuah ........................ | G06F 16/289 715/765 |
| 2007/0234300 A1 * | 10/2007 | Leake ................. | G06F 11/3688 717/124 |

(Continued)

*Primary Examiner* — Tuan A Vu
(74) *Attorney, Agent, or Firm* — Spencer Fane LLP; Steven J. Laureanti

(57) ABSTRACT

A system and method are disclosed for quality assurance and performance testing of supply chain applications and systems. Embodiments include providing a user interface for receiving a test case file that describes one or more actions to be tested and a properties file that maps one or more elements to one or more values, translating a received test case file and a corresponding properties file into a test case, and executing the test case by identifying the one or more actions identified in the test case and automatically invoking one or more testing components configured to execute a test using the one or more actions, wherein at least one of the one or more testing components is configured execute performance testing, and at least one of the one or more testing components is configured to execute regression testing.

18 Claims, 5 Drawing Sheets

(56) References Cited

U.S. PATENT DOCUMENTS

| | | | |
|---|---|---|---|
| 2008/0028364 A1* | 1/2008 | Triou | G06F 11/3676 |
| | | | 717/124 |
| 2010/0198799 A1* | 8/2010 | Krishnan | G06F 11/3696 |
| | | | 706/46 |
| 2015/0154415 A1* | 6/2015 | Wu | G06F 11/3684 |
| | | | 713/165 |
| 2016/0170867 A1* | 6/2016 | Koneru | G06F 11/3688 |
| | | | 717/125 |
| 2017/0052877 A1* | 2/2017 | Ganda | G06F 11/3664 |
| 2017/0192879 A1* | 7/2017 | Athinathan | G06F 11/3668 |
| 2018/0060210 A1* | 3/2018 | Pandey | G06F 11/368 |
| 2018/0137035 A1* | 5/2018 | Magre | G06F 11/3692 |
| 2019/0018546 A1* | 1/2019 | Kwizera | G06F 3/0481 |
| 2019/0324897 A1* | 10/2019 | Subramanian | G06F 11/3688 |

\* cited by examiner

SYSTEM AND METHOD OF AUTOMATED QUALITY ASSURANCE AND PERFORMANCE TESTING FRAMEWORK

CROSS-REFERENCE TO RELATED APPLICATIONS

The present disclosure is related to that disclosed in the U.S. Provisional Application No. 62/665,674, filed May 2, 2018, entitled "System and Method of Automated Quality Assurance and Performance Testing Framework." U.S. Provisional Application No. 62/665,674 is assigned to the assignee of the present application. The subject matter disclosed in U.S. Provisional Application No. 62/665,674 is hereby incorporated by reference into the present disclosure as if fully set forth herein. The present invention hereby claims priority under 35 U.S.C. § 119(e) to U.S. Provisional Application No. 62/665,674.

TECHNICAL FIELD

The present disclosure relates generally to an automation testing framework and specifically to a system and method of platform-independent cloud-based quality assurance and performance testing.

BACKGROUND

In supply chains, the various supply chain processes are controlled by different systems, spread over many locations and built on different computing platforms. As supply chains and other industries integrate the systems that underlie these processes with cloud-based systems, the tools for testing the quality assurance and performance of the systems need to improve. Quality assurance and performance testing comprises a mixture of cloud-based and non-cloud-based technologies and requires testing tools that can handle a wide variety of clients. Quality assurance and performance testing would be benefited by having a standard test case format that is usable across different platforms, different clients, and different testing types. Currently, testing of systems is done by many different tools, each only able to test a small number of systems, so that each tool may do some types of testing, but not all. Each tool has a different setup process, setup time, architecture, and test case syntax. This fragmentation of testing tools wastes much time in setting up different tools and learning different syntax.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
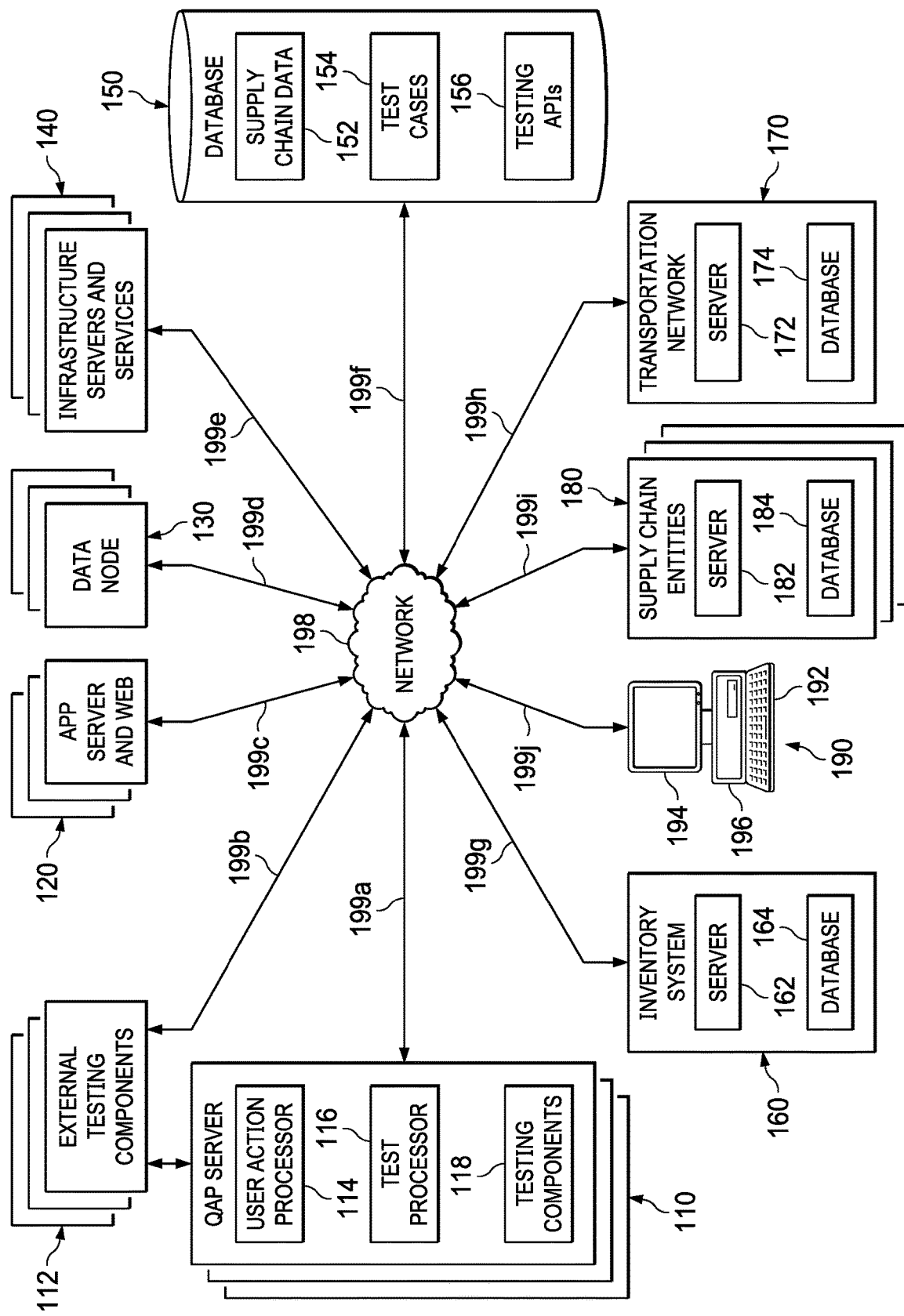
FIG. 1 illustrates an exemplary distributed supply chain network, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Supply chain process control systems are built on different computing platforms and spread throughout the supply chain network. As supply chains and other industries integrate the systems that underlie these processes with cloud-based systems, the tools for testing the quality assurance and performance (QAP) of the systems need to improve. QAP testing comprises a mixture of cloud-based and non-cloud-based technologies and requires testing tools that can handle a wide variety of clients, such as, for example, HTML-based web user interfaces, rich user interfaces having integrated spreadsheets, thick clients, and the like. QAP testing would be benefited by having a standard test case format that is usable across different platforms, different clients, and different testing types.

QAP testing of supply chain systems and programs include regression testing and performance testing. Regression testing may be done automatically using an automation testing framework. Automation testing framework uses automation tools to test a program by automatically performing predefined actions described in a test case. The automation tools then compare the test program results with the expected results. If the results align, the program is behaving properly. If the results do not align, the program likely contains one or more errors. Fixing these errors often comprises, for example, examining the program code, identifying and altering the code to fix errors, and running additional tests until the actual and expected outcomes align. In addition to regression testing, QAP testing includes performance testing. Performance testing determines the responsiveness and stability of a system under a particular workload. It can also serve to investigate, measure, validate, or verify other quality attributes of the system, such as scalability, reliability, and resource usage.

As described below, embodiments of the following disclosure comprise an automation testing framework having an infrastructure highly adapted to advanced automation of QAP testing of multi-solution, platform-independent programs and systems. According to particular aspects, embodiments include a user interface package for automation testing framework to perform multi-threaded cloud-based regression testing, smoke testing, performance testing, load testing, issue replication, performance benchmarking, and baselining all of which are easily configured using the automation tools of testing system interface 400 and a unified test case writing technique that is product-, solution-, and technology-independent. As described below, embodiments comprise a single workflow that extends across regression and performance testing and translates standardized test case files to directly invoke the appropriate testing components. These and other embodiments described in the following disclosure reduce cycle time, extend across many supply chain systems and programs, run tests significantly faster than human users, replicate issues, reliably perform the same operation, allow comprehensive testing of nearly every feature in software applications (including sophisticated tests that bring hidden information), has zero defect seepage, no overhead, and a central repository.

FIG. 1 illustrates exemplary distributed supply chain network 100, according to an embodiment. Distributed supply chain network 100 comprises one or more QAP servers 110, one or more external testing components 112, one or more application and/or web servers 120, one or more data nodes 130, one or more infrastructure servers and services 140, database 150, inventory system 160, transportation network 170, one or more supply chain entities 180, computer 190, network 198, and communication links 199a-199j. Although one or more QAP servers 110, one or more external testing components 112, one or more application and/or web servers 120, one or more data nodes 130, one or more infrastructure servers and services 140, a single database 150, a single inventory system 160, a single transportation network 170, one or more supply chain entities 180, a single computer 190, a single network 198, and one or more communication links 199a-199j are shown and described, embodiments contemplate any number of QAP servers, external testing components, application and/or web servers, data nodes, infrastructure servers and services, databases, inventory systems, transportation networks, supply chain entities, computers, networks, and communication links, according to particular needs.

One or more QAP servers 110 comprise user action processor 114, test processor 116, and testing components 118 that support various QAP testing tools based on an automated testing framework and provides the ability to automate test cases for both web- and operating system (OS)-based programs (such as, for example, WINDOWS operating system-based programs) and generate detailed reports dynamically for regression testing and Performance, Scalability, and Reliability (PSR) testing. As described in more detail below, user action processor 114 receives and processes a user input (such as, for example, receiving a user input from a graphical user interface, described in more detail below) and decides the action to be invoked. Test processor 116 receives test case and properties files, processes the files, and then invokes one or more testing components 118 and/or one or more external testing components 112 comprising automation and testing tools for multi-threaded QAP testing. As explained in more detail below, the test cases that allows regression testing and performance testing for both OS and web applications to be written in a standardized format. As explained in more detail below, test processor 116 automatically chooses the correct one or more testing components 118 and external testing components 112 by invoking the appropriate underlying Application Program Interfaces APIs 156 based on the standardized format in the test cases.

According to embodiments, QAP server 110 supports technology stacks including, the web, a thick client, JAVA applications, rich user interface, Putty, and Citrix Web. Although QAP server 110 is described in connection with supply chain systems and programs, embodiments contemplate regression and performance testing for applications including workforce management, assortment planning, allocation planning, order promising, enterprise simulation planning, sales and operation planning, order optimization, inventory optimization, demand planning, flow casting, order fulfillment, dispatching and transportation management. Additionally, QAP server 110 is industry-agnostic and may perform QAP testing in any industry, including, for example, retail, supply chain, warehouse management, transportation management, workforce management, and other areas.

As described in more detail below, external testing components 112 may comprise one or more modules that support processes to perform testing on one or more programs of one or more application and/or web servers 120 and is capable of storing, receiving, processing, communicating, and modifying data stored at one or more data nodes 130 or database 150.

According to embodiments, one or more application and/or web servers 120 store, receive, process, communicate, and modify data at one or more data nodes 130 and/or database 150. One or more application and/or web servers 120 host applications that support one or more supply chain processes, including, for example, supply chain management, inventory optimization, or retail, manufacturing, enterprise, or utility planning. In addition, one or more data nodes 130 and database 150 may comprise any physical or virtual server, and any supporting hardware or software, supporting the storage of data at one or more locations local to, or remote from, QAP server 110 and one or more application and/or web servers 120.

Database 150 comprises one or more databases or other data storage arrangements at one or more locations, local to, or remote from, QAP server 110, one or more application and/or web servers 120, one or more data nodes 130, supply chain entities 180, and computer 190. According to embodiments, database 150 comprises supply chain data 152, test case data 154, and APIs 156.

Supply chain data 152 may comprise, for example, metadata, which is comprised of dimensions, hierarchies, levels, members, attributes, and member attribute values, and fact data, comprising measure values for combinations of members. Data stored in database 150 may be, for example, various decision variables, business constraints, goals, and objectives of supply chain entities 180. According to other embodiments, supply chain data 152 may comprise for example, various decision variables, business constraints, goals and objectives of one or more supply chain entities 150. According to some embodiments, supply chain data 152 may comprise hierarchical objectives specified by, for example, business rules, master planning requirements along with scheduling constraints and discrete constraints, such as, for example, sequence dependent setup times, lot-sizing, storage, shelf life, and other like constraints.

According to an embodiment, test case data 154 may comprise test case files and properties files. According to embodiments, QAP server 110 accepts test cases that are formatted as comma-separated files (CSV) and include the properties identified in a properties file associated with the particular test case type. The test cases may be bundled with the programs they test and may function automatically behind a cloud and a firewall.

According to embodiments, test case files of the test cases comprise five elements: test case name, action type, selector, value, and/or dataset. Each test case comprises line items that specify the test case name and subsequent line items comprise actions to execute the test case, as described in more detail below.

Additionally, a properties file of the test cases comprises a map between a user interface element and its locator. According to some embodiments, a properties file may comprise an object map between user interface elements and the way to find it, such as, for example, a mapping between a web element and the corresponding locator type and value. According to embodiments, the mapping for the various elements in an application are stored in different locations, depending on the framework of the application. For example, some frameworks store an object repository in a properties file, and some store it inside an XML or a database file, such as, for example, a MICROSOFT EXCEL spreadsheet format.

Some embodiments of automation testing framework 200 include test cases that are written with a standardized methodology that is similar for regression and performance testing, and re-usable for different versions of the same software. While test case format for regression and performance testing is similar, according to embodiments, there is difference in what is provided for regression and for performance testing. Similar to a TestCaseName column, a performance test case format may comprise a scenario (Performance Test Case Scenario) column. Each Test Case Scenario may comprise multiple transactions (Transaction_Name column) and each transaction may comprise one or more requests to send to the server (Request_URL). Each request may comprise a post parameter associated based on a request type. Also, each request may comprise other required data, such as, for example, a regular expression to retrieve dynamic request parameters and host/port details if a request is made for another server. The test case processor, as described in more detail below, may identify if a user requested regression testing or performance testing based on the user input and the test case file format. The test case process may invoke a performance testing component in case of performance testing and, for regression testing, test processor 116 may identify the proper testing component based on the action type and invoke the proper testing component using one or more testing APIs 156. According to embodiments, the test case files are the same for both regression and performance testing and for windows and web applications. Test processor 116 translates test case files to invoke the underlying testing APIs 156. According to embodiments, QAP server 110 is deployed on a cloud with access to APIs 156 available for integration. Here, integration indicates that, although the QAP processes may be run from testing system interface 400, one or more supply chain entities may use one or more scripts, commands, and/or APIs 156 from the backend to utilize the testing APIs 156 from QAP server 110 to integrate QAP testing with their supply chain processes.

Inventory system 160 comprises server 162 and database 164. Server 162 of inventory system 160 is configured to receive and transmit item data, including item identifiers, pricing data, attribute data, inventory levels, and other like data about one or more items at one or more locations in distributed supply chain network 100. Server 162 stores and retrieves item data from database 164 of inventory system 160, database 150, or one or more locations in distributed supply chain network 100.

Transportation network 140 comprises server 142 and database 144. According to embodiments, transportation network 140 directs one or more transportation vehicles 146 to ship one or more items between one or more supply chain entities 150 at least partially based on an inventory policy, target service levels, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with supply chain planner 110, one or more imaging devices 120, inventory system 130, transportation network 140, and one or more supply chain entities 150 to identify the location of transportation vehicle 146 and the location of any inventory or shipment located on transportation vehicle 146. According to embodiments, transportation vehicles may be associated with one or more suppliers, manufacturers, distributors, or retailers, or another supply chain entity, according to particular needs and be directed by automated navigation including GPS guidance.

As shown in FIG. 1, distributed supply chain network 100 comprising QAP server 110, external testing components 112, one or more application and/or web servers 120, one or more data nodes 130, one or more infrastructure servers and services 140, database 150, inventory system 160, transportation network 170, supply chain entities 180, computer 190, network 198, and communication links 199a-199j may operate on one or more computers that are integral to or separate from the hardware and/or software that support QAP server 110, external testing components 112, one or more application and/or web servers 120, one or more data nodes 130, one or more infrastructure servers and services 140, database 150, inventory system 160, transportation network 170, supply chain entities 180, computer 190, network 198, and communication links 199a-199j. Computer 190 may include any suitable input device 192, such as a keypad, mouse, touch screen, microphone, or other device to input information. Output device 194 may convey information associated with the operation of distributed supply chain network 100, including digital or analog data, visual information, or audio information.

Computer 190 may include fixed or removable computer-readable storage media, including a non-transitory computer readable medium, magnetic computer disks, flash drives, CD-ROM, in-memory device or other suitable media to receive output from and provide input to distributed supply chain network 100. Computer 190 may include one or more processors 196 and associated memory to execute instructions and manipulate information according to the operation of the distributed supply chain network 100 and any of the methods described herein. In addition, or as an alternative, embodiments contemplate executing the instructions on computer 190 that cause computer 190 to perform functions of the method. Further examples may also include articles of manufacture including tangible non-transitory computer-readable media that have computer-readable instructions encoded thereon, and the instructions may comprise instructions to perform functions of the methods described herein.

QAP server 110, external testing components 112, one or more application and/or web servers 120, one or more data nodes 130, one or more infrastructure servers and services 140, database 150, inventory system 160, transportation network 170, and supply chain entities 180 may each operate on one or more separate computers, a network of one or more separate or collective computers, or may operate on one or more shared computers. In addition, distributed supply chain network 100 may comprise a cloud-based computing system having processing and storage devices at one or more locations, local to, or remote from QAP server, external testing components 112, one or more application and/or web servers 120, one or more data nodes 130, one or more infrastructure servers and services 140, database 150, inventory system 160, transportation network 170, and supply chain entities 180. In addition, each of the one or more computers 190 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with QAP server 110, external testing components 112, one or more application and/or web servers 120, one or more data nodes 130, one or more infrastructure servers and services 140, database 150, inventory system 160, transportation network 170, and supply chain entities 180. These one or more users may include, for example, a "manager" or a "planner" handling automated application testing and/or one or more related tasks within distributed supply chain network 100. In addition, or as an alternative, these one or more users within distributed supply chain network 100 may include, for example, one or more computers programmed to autonomously handle, among other things, production planning, demand planning, option planning, sales and operations planning, order placement, automated warehouse operations (including removing items from and placing items in inventory), robotic production machinery (including building or items), and/or one or more related tasks within distributed supply chain network 100.

One or more supply chain entities 180 may comprise server 182 and database 184. One or more supply chain entities 180 represent one or more suppliers, manufacturers, distributors, and retailers in one or more supply chain networks, including one or more enterprises.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another one or more supply chain entities 180, such as a supplier, an item that needs further processing, or any other item. A manufacturer may, for example, produce and sell a product to a supplier, another manufacturer, a distributor, a retailer, a customer, or any other suitable person or an entity. Such manufacturers may comprise automated robotic production machinery that produce products based, at least in part, on a supply chain plan, a material or capacity reallocation, current and projected inventory levels, and/or one or more additional factors described herein.

One or more suppliers may be any suitable entity that offers to sell or otherwise provides one or more components to one or more manufacturers. Suppliers may comprise automated distribution systems that automatically transport products to one or more manufacturers based, at least in part, on a supply chain plan, a material or capacity reallocation, current and projected inventory levels, and/or one or more additional factors described herein.

One or more distributors may be any suitable entity that offers to sell, warehouse, transport, or distribute at least one product to one or more retailers and/or customers. Distributors may, for example, receive a product from a first supply chain entity in distributed supply chain network 100 and store and transport the product for a second supply chain entity. Such distributors may comprise automated warehousing systems that automatically transport to one or more retailers or customers and/or automatically remove from or place into inventory products based, based, at least in part, on a supply chain plan, a material or capacity reallocation, current and projected inventory levels, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more suppliers, manufacturers, distributors, and retailers are shown and described as separate and distinct entities, the same entity may simultaneously act as any one or more suppliers, manufacturers, distributors, and retailers. For example, one or more supply chain entities 180 acting as a manufacturer could produce a product, and the same entity could act as a supplier to supply a product to another one or more supply chain entities 180. Although one example of distributed supply chain network 100 is shown and described; embodiments contemplate any configuration of distributed supply chain network 100, without departing from the scope of the present disclosure.

In one embodiment, QAP server 110 may be coupled with network 198 using communications link 199a, which may be any wireline, wireless, or other link suitable to support data communications between QAP server 110 and network 198 during operation of distributed supply chain network 100. External testing components 112 may be coupled with network 198 using communications link 199b, which may be any wireline, wireless, or other link suitable to support data communications between external testing components 112 and network 198 during operation of distributed supply chain network 100. One or more application and/or web servers 120 may be coupled with network 198 using communications link 199c, which may be any wireline, wireless, or other link suitable to support data communications between one or more application and/or web servers 120 and network 198 during operation of distributed supply chain network 100. One or more data nodes 130 may be coupled with network 198 using communications link 199d, which may be any wireline, wireless, or other link suitable to support data communications between one or more data nodes 130 and network 198 during operation of distributed supply chain network 100. One or more infrastructure servers and services 140 may be coupled with network 198 using communications link 199e, which may be any wireline, wireless, or other link suitable to support data communications between one or more infrastructure servers and services 140 and network 198 during operation of distributed supply chain network 100. Database 150 may be coupled with network 198 using communications link 199f, which may be any wireline, wireless, or other link suitable to support data communications between database 150 and network 198 during operation of distributed supply chain network 100. Inventory system 160 may be coupled with network 198 using communications link 199g, which may be any wireline, wireless, or other link suitable to support data communications between inventory system 160 and network 198 during operation of distributed supply chain network 100. Transportation networks may be coupled with network 198 using communications link 199h, which may be any wireline, wireless, or other link suitable to support data communications between transportation networks and network 198 during operation of distributed supply chain network 100. One or more computers may be coupled with network 198 using communications link 199i, which may be any wireline, wireless, or other link suitable to support data communications between the one or more computers and network 198 during operation of distributed supply chain network 100. One or more supply chain entities 180 may be coupled with network 198 using communications link 199j, which may be any wireline, wireless, or other link suitable to support data communications between one or more supply chain entities 180 and network 198 during operation of distributed supply chain network 100.

Although communication links 199a-199j are shown as generally coupling QAP server 110, external testing components 112, one or more application and/or web servers 120, one or more data nodes 130, one or more infrastructure servers and services 140, database 150, inventory system 160, transportation network 170, one or more supply chain entities 180, and computer 190 to network 198, each of QAP server 110, external testing components 112, one or more application and/or web servers 120, one or more data nodes 130, one or more infrastructure servers and services 140, database 150, inventory system 160, transportation network 170, one or more supply chain entities 180, and computer 190 may communicate directly with each other, according to particular needs.

In another embodiment, network 198 includes the Internet and any appropriate local area networks (LANs), metropolitan area networks (MANs), or wide area networks (WANs) coupling QAP server 110, external testing components 112, one or more application and/or web servers 120, one or more data nodes 130, one or more infrastructure servers and services 140, database 150, inventory system 160, transportation network 170, one or more supply chain entities 180, and computer 190. For example, data may be maintained by locally or externally of QAP server 110, external testing components 112, one or more application and/or web servers 120, one or more data nodes 130, one or more infrastructure servers and services 140, database 150, inventory system 160, transportation network 170, one or more supply chain entities 180, and computer 190 and made available to one or more associated users of QAP server 110, external testing components 112, one or more application and/or web servers 120, one or more data nodes 130, one or more infrastructure servers and services 140, database 150, inventory system 160, transportation network 170, one or more supply chain entities 180, and computer 190 using network 198 or in any other appropriate manner. For example, data may be maintained in a cloud database at one or more locations external to QAP server 110, external testing components 112, one or more application and/or web servers 120, one or more data nodes 130, one or more infrastructure servers and services 140, database 150, inventory system 160, transportation network 170, one or more supply chain entities 180, and computer 190 and made available to one or more associated users of QAP server 110, external testing components 112, one or more application and/or web servers 120, one or more data nodes 130, one or more infrastructure servers and services 140, database 150, inventory system 160, transportation network 170, one or more supply chain entities 180, and computer 190 using the cloud or in any other appropriate manner. Those skilled in the art will recognize that the complete structure and operation of network 198 and other components within distributed supply chain network 100 are not depicted or described. Embodiments may be employed in conjunction with known communications networks and other components.

In accordance with the principles of embodiments described herein, applications supported by one or more application and/or web servers 120 may reallocate inventory of one or more items among demands or orders of one or more supply chain entities 180. Furthermore, applications supported by one or more application and/or web servers 120 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 180, and the configuration and quantity of packaging and shipping of items based on current inventory or production levels. For example, methods described herein may include computers 190 receiving product data from automated machinery having at least one sensor and the product data corresponding to an item detected by the automated machinery. The received product data may include an image of the item, an identifier, as described above, and/or other product data associated with the item (dimensions, texture, estimated weight, and any other like data). The method may further include computers 190 looking up the received product data in a database system associated with applications supported by one or more application and/or web servers 120 to identify the item corresponding to the product data received from the automated machinery.

Computers 190 may also receive from the automated machinery, a current location of the identified item. Based on the identification of the item, computers may also identify (or alternatively generate) a first mapping in distributed supply chain network 110, where the first mapping is associated with the current location of the identified item. Computers may also identify a second mapping in distributed supply chain network 110, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, at least in part, on one or more differences between the first mapping and the second mapping such as, for example, to locate items to add to or remove from an inventory of one or more supply chain entities.

Figure 2:
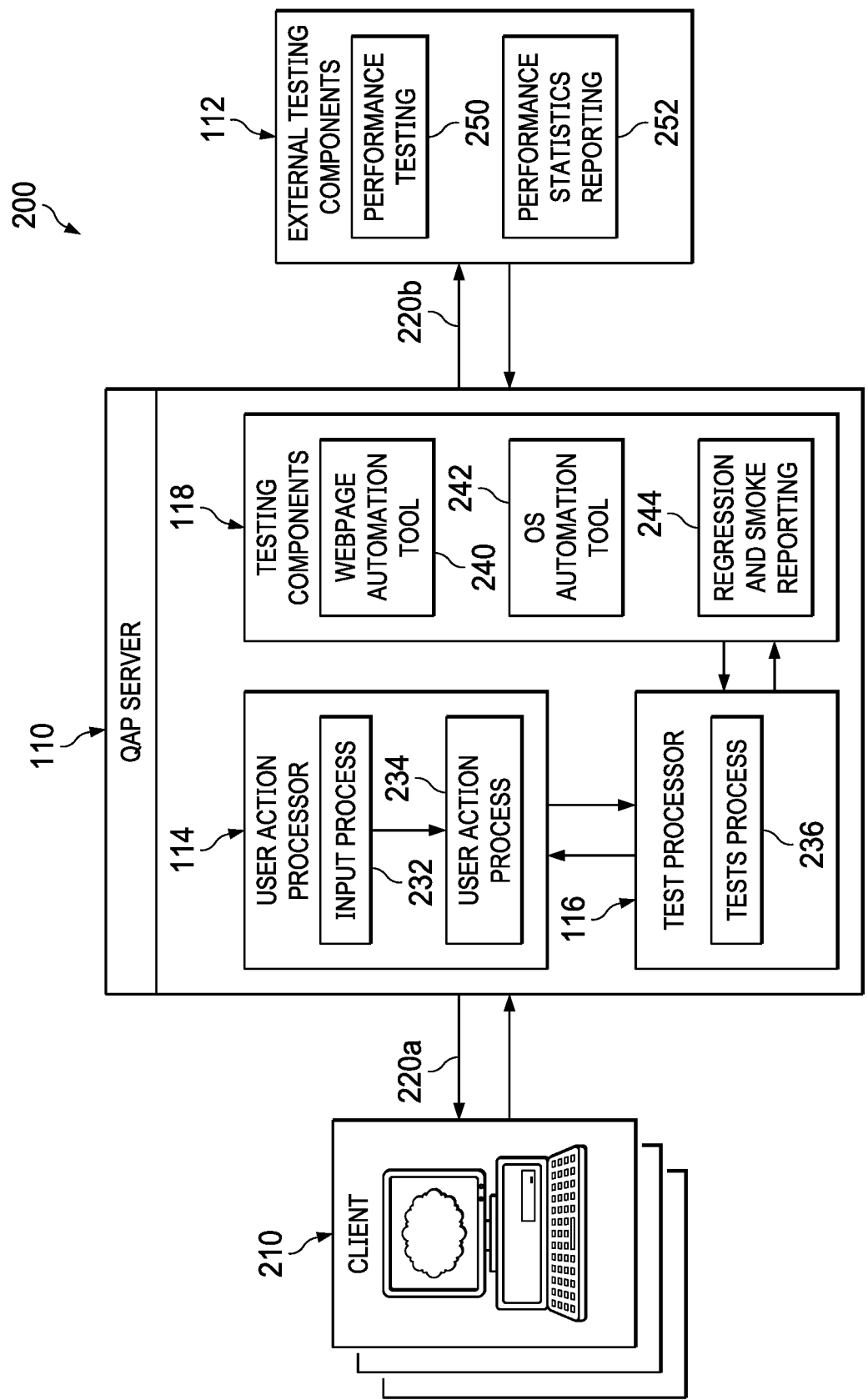
FIG. 2 illustrates a high-level architecture diagram of the QAP server of FIG. 1, in accordance with an embodiment.

FIG. 2 illustrates high-level architecture diagram 200 of QAP server 110 of FIG. 1, in accordance with an embodiment. High-level architecture diagram 200 comprises QAP server 110, external testing components 112, one or more clients 210, and communication links 220a-220b. As discussed above in connection with FIG. 1, QAP server 110 comprises user action processor 114, test processor 116, and one or more testing components 118 and is communicatively coupled with one or more external testing components 112 and one or more client computers 210. QAP server 110 communicates with one or more client computers 210 and the one or more external testing components 112 using one or more communications links 220a-220b, which may be any wireline, wireless, or other link suitable to support data communications between QAP server 110, one or more external testing components 112, one or more clients 210, and network 198 during operation of distributed supply chain network 100.

As discussed above, user action processor 114 receives and processes a user input at input process 232 and decides the action to be invoked at user action process 234. For example, QAP server 110 receives test cases and test case parameters by a user interface, such as, for example, a graphical user interface (GUI), that provides for the selection and input of one or more options, parameters, and other variables associated with a test case for a particular application to be tested, as described in more detail herein.

Also, as discussed herein, test processor 116 receives test case and properties files at tests process 236, processes the files, and, if test processor 116 validates the received files, creates a test case for use during application testing. Additionally, test processor 116 may invoke an external testing component for testing one or more applications by calling one or more APIs 156 that execute one or more processes of external testing components 112. According to embodiments, test processor 116 executes the validated test cases which comprise a test case file and a properties file. As described above, the test case files are written in a standardized format that ignores the software environment of the tested application. However, test processor 116 cannot use the same external testing component or API calls for any application, or even within the same application, because different software environments require different testing processes. Instead, and as described in more detail herein, test processor 116 analyzes the test case file and the properties file to determine the appropriate external testing component and API call for each action required by the test case. For example, a test case may require testing of the application itself, a third-party remote application, a spreadsheet application, any of which may be in different software environments. By reading the test case file and the properties file, test processor 116 invokes one or more external testing components 112 using APIs 156 of QAP server 110. Additionally, embodiments may also include parallel execution of web application test cases by multi-threading.

Testing components 118 of QAP server 110 may comprise webpage automation tool 240, OS automation tool 242, and regression and smoke reporting module 244. Based on the identified action type for the user actions, test processor 116 calls the appropriate external testing components 112 that support testing that action of the application. According this example, test processor 116 would call an API of webpage automation tool 240 in response to selection of an add to cart button during regression testing of the application. By way of a further example of regression analysis, an application may comprise an OS-based application (such as, for example, a WINDOWS-based application) that receives data entry by a MICROSOFT EXCEL spreadsheet. A test case file for this type of application will include actions, such as, for example, open database worksheet, type in data, put data into the first row, or other like user actions. Test processor 116 may then read the test case file and based on the action type of the test case, test processor 116 will call the appropriate external testing component, which, in this example, would comprise the OS automation tool 242.

QAP server 110 leverages regression and smoke reporting module 244 to log information from each step in each test case, and, at the end of the test suite execution, generate a report with detailed information, such as, for example, time taken for test suite execution, time taken for each test case, number of passed and failed test cases, and details at which step a test case has failed, and one or more screenshots identifying reasons for the test case failure.

External testing components 112 of QAP server 110 may comprise performance testing module 250 and performance statistics reporting module 252. Additionally, or in the alternative, one or more external testing components 112 are located external to QAP server 110. According to this embodiment, QAP server 110 acts as a wrapper around performance testing module 250 and uses scripting to invoke performance testing by performance testing module 250. When QAP server 110 passes control to performance testing module 250, QAP server 110 calls performance testing module 250 to retrieve the status of the current testing and periodically generates a report using a call (such as, for example, an AJAX call) on the browsers. Although performance testing module 250 is illustrated and described as external to QAP server 110, performance testing module 250 and any of the other one or more testing components 118 and one or more external testing components 112 may be located at any suitable location in distributed supply chain network 100, internal or external, of QAP server 110, according to particular needs. According to embodiments, performance statistics reporting module 252 may generate detailed explanations including, for example, response times for each node, identify errors, response time differences compared to the number of requests, and percentile-based quoting.

To further illustrate testing using QAP server 110, an example is now given. When a new cloud-based application is created, such as, for example, a demand forecast program for a retail planning solution, user interface of QAP server 110 may be used to create a folder corresponding to the new product. Test cases may then be created using a spreadsheet editing program to create test case files and properties file to represent the parameters for the new test cases. The test cases are then associated with the URL pointing to one or more application and/or web servers 120 that hosts the newly-created program which is being tested, and QAP server 110 executes the test cases on the newly-created program.

Additionally, QAP server 110 provides a user interface through which users can initiate supported actions including, for example, uploading and downloading input files, starting a regression suite for a selected product and customer combination, and PSR testing for any selected product. According to embodiments, one or more of the described supported actions of testing system interface 400 is also available as an API via batch to be triggered via different means for seamless execution and integration.

Figure 3:
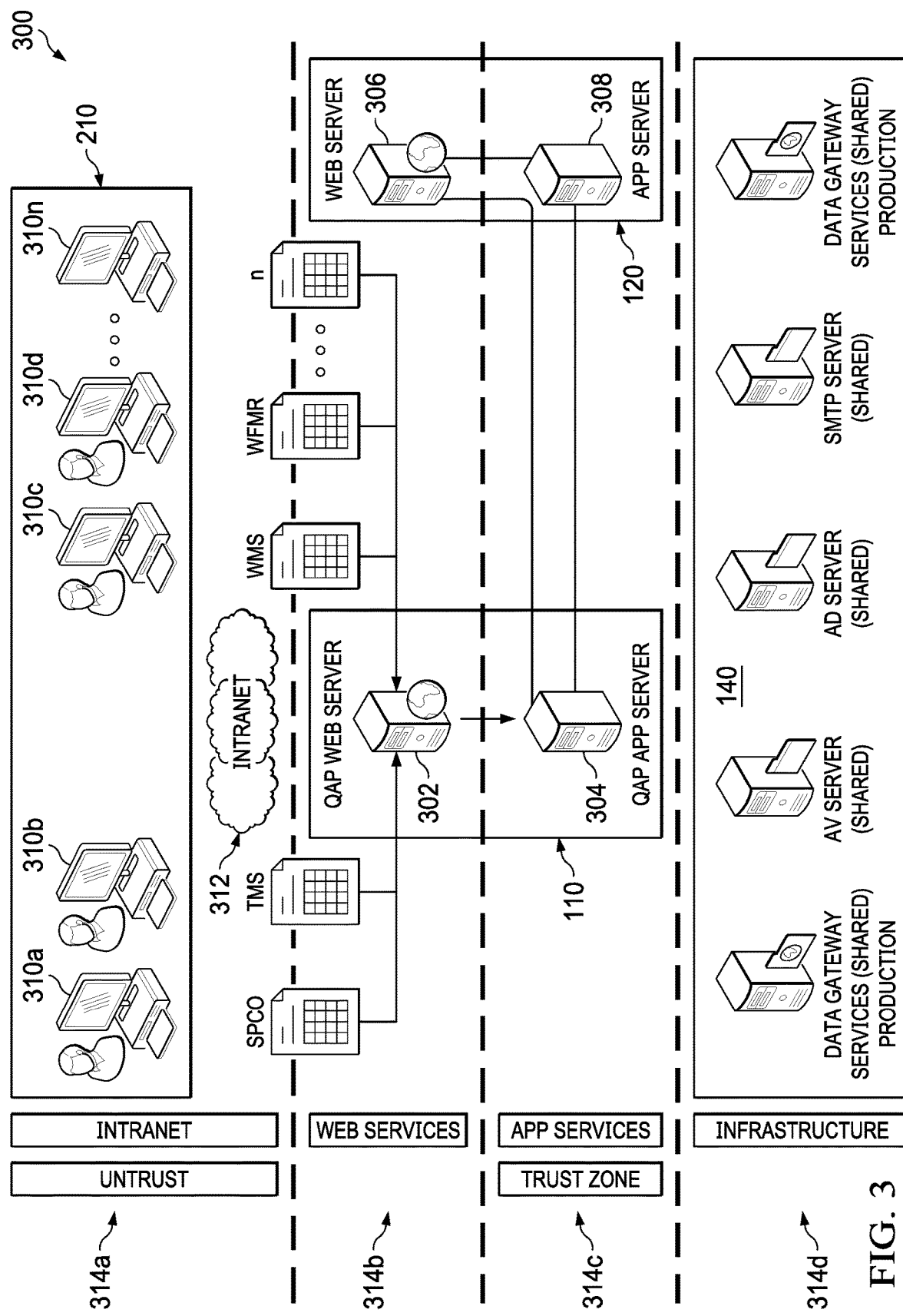
FIG. 3 illustrates an automation testing framework, in accordance with a cloud-based architecture embodiment.

FIG. 3 illustrates automation testing framework 300, in accordance with a cloud-based architecture embodiment. According to this embodiment, automation testing framework 300 comprises QAP server 110, one or more application and/or web servers 120, one or more client computers 210, and one or more infrastructure services and servers 140. According to one embodiment, automation testing framework 300 comprises a cloud-based architecture that supports one or more supply chain network cloud-based applications hosted on one or more application and/or web servers 120 which may be tested by QAP server 110. According to embodiments, QAP server 110 of cloud-based architecture 300 may comprise one or more components of an application server and/or a web server. For example, user action processor 114 receives user inputs, calls test processor 116 service, and displays results dynamically, such as by QAP web server 302. Test processor 116 comprises required business logic to invoke testing components 118 and/or external testing components 112, such as by QAP app server 304. In addition, and as described in more detail herein, one or more application and web servers 120 may comprise one or more web servers 306 and one or more application servers 308.

As described above, the cloud-based applications may comprise programs for one or more supply chain network processes and be accessed by one or more clients 210 including, for example, supply chain planning and optimization client (SCPO) 310a, transportation management systems client (TMS) 310b, warehouse management systems client (WMS) 310c, workforce management client (WFMR) 310d, and one or more additional supply chain network process clients 310n. As discussed above, cloud-based applications may be tested using QAP server 110.

Automation testing framework 300 may include one or more client computers 210 hosted on internal network 312, which may comprise an intranet of one or more supply chain entities 180. One or more client computers 210 may host a thin or thick client to access the cloud-based applications supported by one or more application and/or web servers 120 and/or the one or more web servers 208.

According to an embodiment, automation testing framework 300 comprises four organizational layers 314a-314d: untrust layer 314a, web services layer 314b, app services layer 314c, and infrastructure layer 314d.

QAP web server 302 and any other web servers may be present in web services layer 314b. QAP web server 302 supports a user interface for configuring and initiating automation testing that may be accessed by the one or more client computers 210. QAP web server 302 may receive test case files and properties files from one or more client computers 210 which define the parameters for the application testing. QAP web server 302 and any other web servers may send and receive data from QAP app server 304 and any one or more web servers 306 and/or one or more application servers 308 supporting cloud-based applications.

As described in more detail below, QAP app server 204 may initiate one or more tests on one or more web servers 306 and/or one or more application servers 308 based on communications received form QAP web server 302 and according to the configurations indicated in the test case files. According to embodiments, QAP app server 304 initiates a test by sending a request to one or more web servers 306 and/or one or more application servers 308 supporting the tested cloud-based application. One or more web servers 306 and/or one or more application servers 308 may then execute the request in parallel on one or more web servers 306 supporting the cloud-based application. After testing, one or more web servers 306 may then communicate results and reports from the testing to QAP app server 304.

Additionally, automation testing framework 300 comprises infrastructure layer 314d comprising one or more infrastructure servers and services 140. According to embodiments, infrastructure layer 314d comprises a collection of multiple common services shared by one or more application/web servers and may include, for example, SMTP server providing E-mail services to send regression and performance testing reports to a requester, an antivirus server to protect servers from computer viruses and/or malware, an AD server, data gateway services, and the like.

Although automation testing framework 200 is described as comprising a single QAP web server 302, a single QAP app server 304, one or more web servers 306, one or more application servers 308, one or more client computers 210, and one or more infrastructure services and servers 140, embodiments contemplate an automation testing framework 300 comprising any suitable number or configuration of QAP web servers, QAP app servers, application servers, web servers, client computers, and infrastructure services and servers, according to particular needs.

Figure 4:
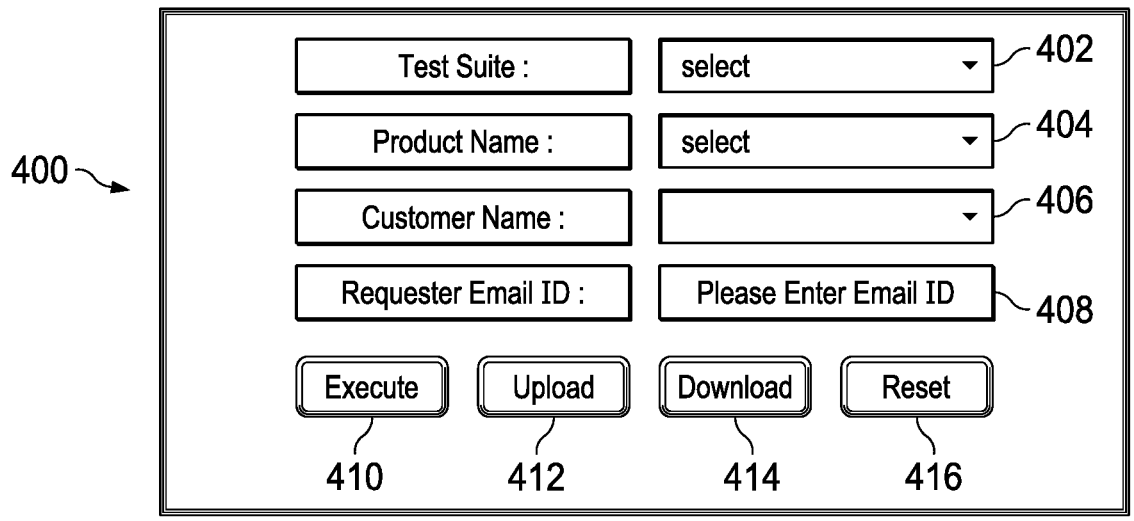
FIG. 4 illustrates an exemplary testing system interface, in accordance with an embodiment.

FIG. 4 illustrates exemplary testing system interface 400, in accordance with an embodiment. Testing system interface 400 generates for display one or more graphical elements and user-selectable elements, which, upon selection, perform one or more actions, as described herein. According to an embodiment, testing system interface 400 provides test suite input 402, product name input 404, customer name input 406, and email ID input 408. Testing system interface 400 may receive one or more inputs for test suite input 402, product name input 404, customer name input 406, and email ID input 408. In response and at least partially based on the received one or more inputs for test suite input 402, product name input 404, customer name input 406, and email ID input 408, QAP server 110 may execute a test case or upload or download a test case file. In addition, testing system interface 400 of QAP server 110 provides for uploading, downloading, and executing test cases. In addition, testing system interface 400 of QAP server 110 provides for resetting one or more inputs for test suite input 402, product name input 404, customer name input 406, and email ID input 408.

As described herein, after creating a test case file and properties file, these files may be uploaded using testing system interface 400 (here, comprising a user interface webpage) of QAP web server 302. Testing system interface 400 may comprise a main navigation screen (here, comprising a user interface homepage) providing one or more user-interactive elements including, for example, dropdown selection lists, selection buttons, text entry boxes, and other like user-interactive elements. A main navigation screen of testing system interface 400 comprises test suite dropdown selection list 402, product name dropdown selection box 404, customer name dropdown selection box 406, requester email address input 408, execute selection button 410, upload selection button 412, download selection button 414, and reset selection button 416. In response to a user selection of an execute button, testing system interface 400 communicates to test processor 116 of QAP web server 302 to begin a selected test suite (including, for example, regression, smoke, performance, and the like), for the selected product (including, for example, SCPO, TMS, WMS, WFMR, and the like) for the selected customer (including, for example, any of supply chain entities 180 using the selected product) and transmit the error log and completed report to the email address entered into the email ID text entry box. In response to a user selection of upload selection button 412, testing system interface 400 displays one or more graphical elements providing for locating, selecting, and uploading a test case file and a properties files to allow the test case described by the documents to be selected for testing. After the test case file and the properties file are successfully uploaded, the test case described by the uploaded files may be downloaded by selection of download selection button 414.

Testing system interface 400 may be accessed by one or more client computers 210 using a web browser and navigating a URL hosting testing system interface 400 of QAP server 110. Embodiments contemplate accessing QAP server 110 by, for example, QAP web server 302 using one or more client computers 210 comprising any suitable client, such as, for example, a rich-user interface client, a thick client, a thin client, or the like.

As described above, testing system interface 400 provides four configurable options: test suite, product name, customer name, and requester email ID. After selection, the four options selected or entered will be used when the test case file and the properties file are uploaded. In response to selection of an execute button (such as, for example, by a user selection using an input device), testing system interface 400 will communicate to test processor 116 of QAP web server 302 to begin the selected test suite (such as, for example, regression), for the selected product (here, SCPO) for the selected customer (such as, for example, customer2) and transmit the error log and completed report to the email address entered into the email ID text entry box (e.g., usernumber1@abccorp.com). According to embodiments, testing system interface 400 provides for selecting and uploading a test case file and a properties file. In response to selection of the upload button of the main navigation screen, testing system interface 400 displays an upload overlay window. Here, a test case file and a corresponding properties file for a particular test case may be selected for upload. In response to selection of upload button 412, QAP web server 202 searches for the selected files, and in response to locating and uploading the selected files, testing system interface 400 may display a confirmation that the files were uploaded and, in addition, make available for selection the test case described by the test case file and the properties file. In response to a successful upload of the test case file and the properties file, testing system interface 400 may display an upload confirmation message, such as, for example, an upload confirmation message displayed on an overlay window with text indicating, "Files uploaded Successfully". Testing system interface 400 may return to a main navigation screen, either automatically or in response to user selection of a close button.

In addition, embodiments of testing system interface 400 provide for executing a test case. After testing system interface 400 returns to the main navigation screen, execute selection button 410 may be selected. In response to user selection of execute selection button 410, testing system interface 400 may begin the selected test suite for the selected product for the customer indicated and send the report to the specified email address. By way of an example and not of limitation, in response to a user selection of an execute button, testing system interface 400 communicates to test processor 116 of QAP web server 302 to begin a selected test suite (including, for example, regression, smoke, performance, and the like), for a selected product (including, for example, SCPO, TMS, WMS, WFMR, and the like) for the selected customer (including, for example, any of supply chain entities 180 using the selected product) and transmit the error log and completed report to the email address entered into the email ID text entry box 408. In response to a user selection of upload selection button 412, testing system interface 400 displays one or more graphical elements providing for locating, selecting, and uploading a test case file and a properties files to allow the test case described by the documents to be selected for testing. After the test case file and the properties file are successfully uploaded, the test case described by the uploaded files may be downloaded by selection of download selection button 414.

According to embodiments, QAP server 110 accepts test cases that are formatted as comma-separated files (CSV) and comprise the properties identified in a properties file associated with the particular test case type. As discussed herein, a properties file comprises a map between a user interface element and its locator.

According to embodiments, QAP server 110 accepts test case files comprising five elements: test case name, action type, selector, value, and/or dataset. Each test case includes two or more line items where the first line item of the test case specifies the test case name and subsequent line items comprise steps to execute the test case. Each step indicates one user action and for each user action, a test case input CSV may comprise an Action Type, Selector, Value and/or Dataset. An action type element indicates an action performed during user interaction with the application, such as, for example, open, click, and the like. According to embodiments, QAP server 110 comprises predefined list of Actions which identify all possible user interactions through User Interface. A Selector element specifies the attribute name which will be used to locate a web element. A Value element specifies the value to be used to match against a specified Selector. A Dataset element specifies a value to be entered in an input element. To eliminate redundancy and for ease of maintenance, embodiments contemplate identifying the actual values for Selector, Value and Dataset elements in the properties file as key=value pairs, where the key is specified in above mentioned fields.

Before a test case may be invoked on QAP server 110, correctly-formatted test case CSV files and associated properties files are uploaded through user interface of QAP server 110. QAP server 110 checks the uploaded files and, if validated, stores the uploaded files as an invokable test case on QAP server 110 web server. QAP server 110 also provides for downloading input files through user interface of QAP server 110. This allows downloaded input files to be modified and then uploaded as updated input files to QAP server 110.

After uploading and validation one or more test cases, QAP server 110 may execute regression testing of one or more programs based on the test cases. User interface of QAP server 110 receives requests for regression test case execution that include selected product/customer combination. QAP server 110 may then validate the product/customer combination, verify if the input files are available, and invoke test case execution.

During regression execution, QAP server 110 application parses input files, resolves properties, and executes test cases by invoking a webpage automation tool API and/or OS automation tool API based on the application test case. According to embodiments, QAP server 110 spawns multiple threads to execute web application test cases in parallel mode by leveraging the capabilities of a multithreading framework and provides implementation for each predefined Action Type in which it locates user interface Web Elements using values from Selector and Value columns and performs specified actions by invoking webpage automation tool 240, OS automation tool 242 and/or their respective APIs. According to embodiments, QAP server 110 dynamically displays results during execution of the test cases execution and sends reports after all test cases are executed.

To further illustrate regression testing according to QAP server 110, an example is now given. According to the following non-limiting example, a newly-developed web application provides for adding one or more accessories to an internet shopping cart by an end user of the application. To test adding accessories to an internet shopping cart by an end user for this exemplary web-application, a test case file would be created that represents the actions taken by the end user to add some accessories to the cart. For example, the test case file may represent each of these actions, such as, for example, the end user logs into the website, the end user then searches for a particular accessory (such as, for example, a laptop bag), the end user navigate to the product page, and any additional actions. According to embodiments, the test case file associates each of these actions with the corresponding user action that takes place in the application. For example, if the test case comprised an additional action, such as, for example, an add to cart action, the corresponding user action in the application will be a user clicks on the add to cart button. As described in more detail below, test processor 116 read the test case file and identifies the action type of each user action.

TABLE 1

| Solution | Test Cases | Normal Run Time (min) | QAP server Run Time (min) |
|---|---|---|---|
| SCPO | 21 | 25 | 1.28 |
| WMS | 13 | 20 | 2.51 |
| WFMR | 2 | 7 | 1.5 |

TABLE 1 illustrates test case runtimes created using QAP server 110 and a comparison of runtimes against previous method of running versus QAP server 110 integrated parallel run. For three selected products, if the run time for twenty-one test cases was twenty-five minutes with QAP server 110, using multiple parallel threads it came down to approximately one and a quarter minutes (i.e. 1.28 minutes).

According to embodiments, regression testing by QAP server 110 begins with preparing a test case file and a properties file. The syntax and format of the test case file will be discussed first, followed by the discussion of the performance test.

A test case file comprises a set of test inputs, execution conditions, and expected results developed for a particular objective, such as to exercise a particular program path or to verify compliance with a specific requirement. QAP server 110 test case file template may comprise five columns.

TABLE 2

| Test case Name | Action Type | Selector | Value | Dataset |
|---|---|---|---|---|

TABLE 2 illustrates the five columns of a test case file, according to an embodiment. Although the test case file is described as comma separated spreadsheet (CSV) file, embodiments contemplate arranging the contents of the test case file in any suitable format of any suitable file type, according to particular needs, including, for example, spreadsheets, text documents, databases, and the like. The use and syntax of each of the five columns will be explained in more detail below.

TABLE 3

| Test case Name | Action Type | Selector | Value | Dataset |
|---|---|---|---|---|
| Login | | | | |

TABLE 3 illustrates the name column of the test case file, according to an embodiment. Test case name indicates the name that will appear in testing system interface 400 to identify the test case. Here, testing system interface 400 will identify the test case as "Login."

TABLE 4

| Test case Name | Action Type | Selector | Value | Dataset |
|---|---|---|---|---|
| Login | open click | | | |

TABLE 4 illustrates the action type column of the test case file, according to an embodiment. Action type comprises simulated interactions between a user and a program, that may be automated during testing of the program. These interactions may simulate input of a mouse, keyboard, touchpad, and/or one or more other input devices such as, for example, simulating the actions of user when using the one or more input devices to perform one or more actions. According to embodiments, the action types may include, for example, open, sendKeys, click, clear, hoverAndSelect, switchFrame, switchToDefaultFrame, dropDown, verifyText, switchWindow, createNewBrowser, switchToOriginalBrowser, getCurrentWindowHandle, swithToChildWindow, swithToParentWindow, wait, and the like.

The third column comprises a selector. Selectors may comprise a selection criteria (such as locators or object identifiers) that allow automation tools to find elements of a web page or application. According to embodiments, the selectors may be prioritized in order of speed, uniqueness, likelihood of mistake with other elements, and other like considerations. According to embodiments, the selectors are prioritized (from highest priority to lowest priority) according to: ID, name, link text, partial link text, tag name, class name, css, and/or xpath. Although the selectors are described according to a particular priority, embodiments contemplate any suitable selection and prioritization of selectors, according to particular needs. Each of the listed selectors locates an element by a slightly different method. For example, an id selector may select an element with the specified @id attribute. A name selector may select the first element with the specified @name attribute. A link text selector may select a link (anchor tag) element which contains text matching the specified link text. A partial link text selector may select a link (anchor tag) element which contains text matching the specified partial link text. A tag name selector may locate an element using a tag name. A class name selector may locate an element using a class name. A css selector may select the element using css selectors. Finally, an xpath selector may locate an element using an xpath expression.

TABLE 5

| Test case Name | Action Type | Selector | Value | Dataset |
|---|---|---|---|---|
| Login | open | id | | |

TABLE 5 illustrates the selector column of the test case file, according to an embodiment locating an element by ID. The most efficient way and preferred way to locate an element on a web page is by ID. An ID for an element will be unique, which easily identifies the element. IDs are the safest and fastest locator option and should always be the first choice even when there are multiple choices, For example, if the webpage element:

```
<input id="email" class="required" type="text"/>
```
is being located by id "email", then the test case file may comprise id for the selector.

TABLE 6

| Test case Name | Action Type | Selector | Value | Dataset |
|---|---|---|---|---|
| Login | Click | Name | | |

TABLE 6 illustrates the selector column of the test case file, according to an embodiment locating an element by name. An element may also be selected by a name attribute. However, if there are more than one element with the same name attribute, an automation testing tool using the test case file may select only the first element with a matching name attribute. If the element:
```
<input name="register" class="required" type="text"/>
```
is being located by name "register", then the test case file may comprise name for the selector.

TABLE 7

| Test case Name | Action Type | Selector | Value | Dataset |
|---|---|---|---|---|
| Login | Click | LinkText | | |

TABLE 7 illustrates the selector column of the test case file, according to an embodiment locating an element by link text. An element may also be selected by link text. However, if there are multiple links with the same link text (such as repeated header and footer menu links), the automation tool may select only the first element matching the link text. If the element:
```
<a href="http://www.abc123456.org">Downloads</a>
```
is being located by linked text "Download", then the test case file may comprise LinkText for the selector.

TABLE 8

| Test case Name | Action Type | Selector | Value | Dataset |
|---|---|---|---|---|
| Login | Click | Partial LinkText | | |

TABLE 8 illustrates the selector column of the test case file, according to an embodiment locating an element by partial link text. An element may also be selected by partial link text. However, if there are multiple links with the same partial link text, the automation tool may select only the first element matching the partial link text. If the element:
```
<a href="http://www.abc123456.org">Download new software</a>
```
is being located by partial linked text "Download", then the test case file may comprise Partial LinkText for the selector.

TABLE 9

| Test case Name | Action Type | Selector | Value | Dataset |
|---|---|---|---|---|
| Login | Click | Tag Name | | |

TABLE 9 illustrates the selector column of the test case file, according to an embodiment locating an element by tag name. TagName may be used to select Group elements such as, for example, select boxes, check boxes, and dropdowns. For example, if the element:

```
<a input id="email" class="required" type="text"/>LOGIN<d>
```
is being located by the name "LOGIN", then the test case file may comprise TagName for the selector.

TABLE 10

| Test case Name | Action Type | Selector | Value | Dataset |
|---|---|---|---|---|
| Login | Click | Class | | |

TABLE 10 illustrates the selector column of the test case file, according to an embodiment locating an element by class. Class name may be used to select elements, but, as described above, some embodiments of automation tools will only select the first element with a matching class name, a class name matching the selected name. If there are more than one element that have the same class is being used to locate an element, then the selector needs to be extended using the classname and its subelements. For example, if the element,
```
<a input id="email" class="required" type="text"/>LOGIN<d>
```
is being located by class "required", then the test case file may comprise class for the selector.

TABLE 11

| Test case Name | Action Type | Selector | Value | Dataset |
|---|---|---|---|---|
| Login | Click | CSS | | |

TABLE 11 illustrates the selector column of the test case file, according to an embodiment locating an element by CSS. CSS may be used to provide style rules for web pages, but it may also be used by automation tools to select elements. Locating elements by CSS may be faster than locating elements by XPath and is usually the fastest and easiest selector to locate complex elements. For example, if the element,
   input[id='email']
is being located by css "input[id='email']", then the test case file may comprise css for the selector.

TABLE 12

| Test case Name | Action Type | Selector | Value | Dataset |
|---|---|---|---|---|
| Login | Click | xpath | | |

TABLE 12 illustrates the selector column of the test case file, according to an embodiment locating an element by XPath. XPath is designed to allow the navigation of XML documents to select individual elements, attributes, or some other part of an XML document for specific processing. There are two types of xpath, native XPath and relative XPath. A Native Xpath directs the XPath to go in direct way, such as:
   html/head/body/table/tr/td
Here, the advantage of specifying native path is, finding an element from the direct path is straightforward, but if the path changes, the XPath will break.

In relative XPath, the relative path is specified, so that XPath finds an element by the path in between. The relative XPath has the advantage that, if there is any change in a webpage coding, the relative XPath may still locate the element, but not if the particular path to the element has changed. If the path changes, finding the address would be difficult and may require checking each node to find the path.

For example, for the relative XPath:
//table/tr/td
the following listed example syntaxes may be used to locate the elements indicated.
Example Syntax to work with Image
xpath=//img[@alt='image alt text goes here']
Example syntax to work with table
path=//table[@id='table1']//tr[4]/td[2]
xpath=(//table[@class='nice'])//th[text( )='headertext']/
Example syntax to work with anchor tag
xpath=//a[contains(@href,'href goes here')]
xpath=//a[contains(@href,'#id1')]/@class
Example syntax to work with input tags
xpath=//input[@name='name2' and @value='yes']

TABLE 13

| Test case Name | Action Type | Selector | Value | Dataset |
|---|---|---|---|---|
| Login | open | Link | Baseurl | |
| | Sendkeys | xpath | Username_xapth | |

TABLE 13 illustrates the value column of the test case file, according to an embodiment. The value column used to pass the location of the element stored in the properties file. For example, if the following:

Username_xapth=//input[@name='name2' and @value='yes']

is being used to locate one or more elements, then the test case file may comprise
the values as indicated.

TABLE 14

| Test case Name | Action Type | Selector | Value | Dataset |
|---|---|---|---|---|
| Login | open | Link | Baseurl | |
| | Sendkeys | xpath | Username_xapth | Username |

TABLE 14 illustrates the dataset column of the test case file, according to an embodiment. The data set column may be used to pass input data of the element that is stored in the properties file. For example, for the following elements:

Baseurl=www.gmail.com
Username=System
Password=Password then the test case file may comprise the entries indicated for the five columns indicated above. In addition to preparing the test case file, the data properties file may also be prepared. Data properties file is a map between a user interface element and its locator, which can also be written as an object map between a user interface element and the way to find it. According to other embodiments, the properties file comprises a mapping between web elements and their corresponding locator types and values. For example, the three distinct values of element name, locator type, and locator value may be used to locate an element uniquely on a web page. According to embodiments, the properties file may be stored in various locations within the system depending on many factors, including the framework used for the application. For example, some frameworks store an object repository in a properties file and others store the object repository inside an XML file or a spreadsheet file. Although these values may be stored in a properties file, embodiments contemplate using the values directly in the test code.

Figure 5:
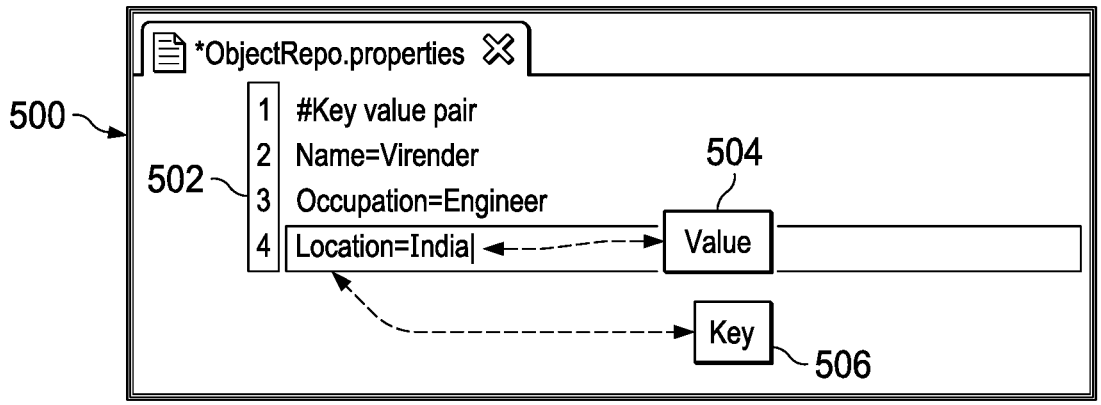
FIG. 5 illustrates a first exemplary properties file, in accordance with an embodiment.

FIG. 5 illustrates first exemplary properties file 500, according to an embodiment. According to embodiments, a property file stores information as key-value pair 502: Key-value pair 502 is represented by two string values separated by an equal sign ("="). Here, a value 504 ("India") is matched to a key 506 ("Location.")

By way of further explanation, and not by limitation, an example comprising a test case file and a property file is now given.

TABLE 15

| Test case Name | Action Type | Selector | Value | Dataset |
|---|---|---|---|---|
| Login | open | Link | Baseurl | |
| | Sendkeys | xpath | Username_xpath | Username |
| | Sendkeys | xpath | Password_xpath | Password |
| | Click | id | Login_id | |

TABLE 15 illustrates an exemplary test case file, according to a first embodiment. The exemplary test case file may be associated with a properties file comprising the following data:

Properties:
Baseurl=https://www.gmail.com
Username_xpath=*//[@name=uname]
Password_xpath==*//[@name=password]
Login_id=login
Username=System
Password=Password The properties data may be saved in any suitable file type or format, such as a properties file format with the particular data structures described herein and according to particular needs.

Figure 6:
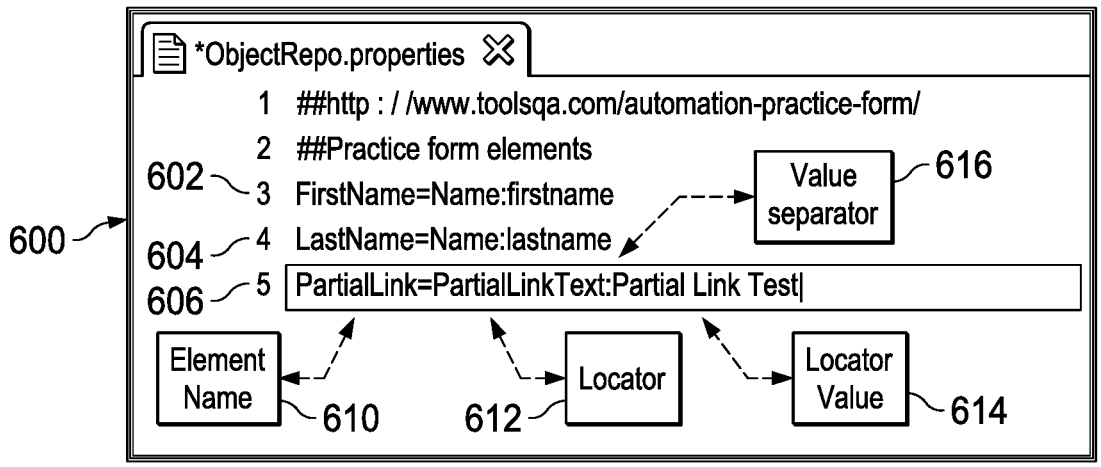
FIG. 6 illustrates a second exemplary properties file for the test case file of TABLE 15, in accordance with a further embodiment.

FIG. 6 illustrates a second exemplary properties file 600 for the test case file of the example in TABLE 15, according to an embodiment. Second exemplary properties file 600 indicates three elements, first name field 602, last name field 604, and link element 606, with "Partial Link Test" as the link text. Continuing with the above example, three values will be stored in the properties file: element name 610, locator type 612, and locator value 614. To separate values, value separator 616, such as a colon (:) may be used. Here the properties value comprises an element name (Partial-Link), a locator (PartialLinkText), a locator value (Partial Link Test), with the locator and the locator value separated by a colon. Additionally, any comments may be added to the properties folder by using the #keyword. As shown above, the text displayed after the # will be green and will not be read by the properties file reader.

TABLE 16

| Test case Name | Action Type | Selector | Value | Dataset |
|---|---|---|---|---|
| Login | open | Link | Baseurl | |
| | Sendkeys | xpath | Username_xapth | Username |

TABLE 16 illustrates an exemplary test case file, according to a second embodiment. All test case data are fetching from this properties file only, generally it is an object repository.

After selection of the execute button, testing system interface 400 may display an alert overlay window with information describing the status of the executed test suite. An overlay window may open and which dynamically displays a status of each test case execution in a test suite.

This information may include, for example, a time stamp, the name of the test cases being tested, the current status of each test case being tested, the thread number of the test case being executed, and the like.

As stated above, after regression testing, QAP server 110 may display results and reports of the test cases executed during the regression testing. After test suite execution is finished, an alert overlay window may display a message indicating the test suite is completed, such as, for example, a message that reads, "Test Suite Execution has completed, Reports will be sent shortly". The message indicates that all test cases in the test case suite have been executed. Also, as indicated above, a report may be sent to an indicated email address. The report may be sent as an attachment to the email as a zipped file. Although the report is described as being sent by email as a zipped attachment, embodiments contemplate transmitting the report in any suitable format of any suitable file type (such as, for example, PDF, text documents, spreadsheets, or the like) through email, instant messaging, uploading the reports to a network location, or the like. After receiving the report, the results may be compared with the expected results. The report may indicate, for example, failed test cases, at which step the test case failed, and a reason for the failure. If the report indicates that one or more errors occurred, the code for the tested programs may be altered to correct for the errors. After the code is altered, the test suite may be run again to look for further errors. This repetition of running the test suite and fixing any error that occurred may be repeated as many times as necessary to remove all of the errors from the tested programs.

Application testing using QAP server is not limited only to regression testing, load testing, and PSR testing. Instead, embodiments of QAP server include issue replication, benchmarking and baselining. For example, QAP server 110 may replicate an issue by automatically running particular keystrokes or processes for short periods of time (such as, for example, several days) to replicate issues (such as, for example, computer errors) that are caused by a combination of factors that take long periods of time to occur. For example, an exemplary supply chain process application may receive an infrequent error that occurs once every few weeks or months (such as, for example, a search for an item by SKU gives an error once every six months, but otherwise behaves normally). According to embodiments, QAP server automatically replicates the issue by running a particular key stroke entry associated with the error repeatedly to simulate the time period over which the error occurs. For example, a particular QAP server may replicate an issue by automatically and repeatedly running the software under parameters associated with the error. By running the software for a couple days, QAP server can replicate issues which typically would appear only after many months of normal usage of the software.

Additionally, embodiments of QAP server perform performance benchmarking by establishing a performance baseline of a particular software application by, for example, executing a predefined set of business critical workflows under an expected ideal load on the server and measuring various metrics, including, for example, Average Response Time, Request Rate, CPU Usage, Memory Usage, and the like based on the results that QAP server 110 is able to provide. The results of performance benchmarking may be used to compare and measure a software application's performance, scalability, and reliability at different application loads and in different environments.

Additionally, or in the alternative, embodiments of QAP server 110 to simulate test cases for different Internet browsers on which the tests may be executed and also choosing the number of threads to execute each test suite. An end user may select any suitable internet browser to run regression test cases and the number of threads to be used. Furthermore, embodiments of QAP server 110 contemplate providing test suite execution on multiple servers with one request and, in addition, providing an administration console for solution setup. Embodiments of QAP server 110 may create significant value proposition in terms of hardware reductions and cycle time reductions.

Figure 7:
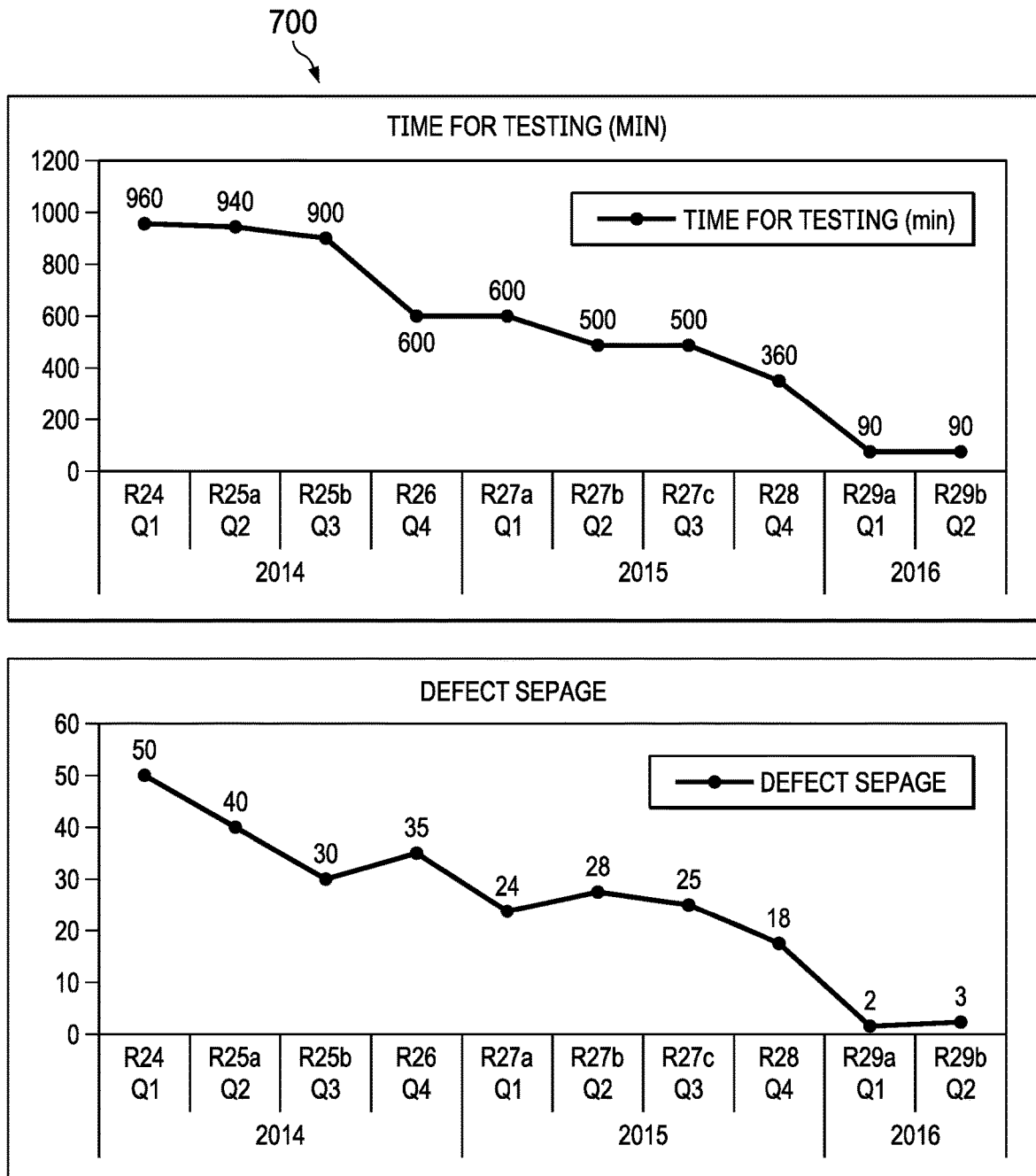
FIG. 7 illustrates a case study for cloud services for an exemplary manufacturer, in accordance with an embodiment.

FIG. 7 illustrates a case study for cloud services for an exemplary manufacturer, according to an embodiment. Time taken for testing 700 is reduced by 10× for an Enterprise Application. This is because QAP server removes manual intervention; QAP server is multithreaded (the above ran on five parallel internet browser windows); defect seepage 702 is reduced by 16× for an enterprise application; and stack upgrades will never break existing functionalities.

According to embodiments, QAP server 110 displays the status of each test case on testing system interface 400 updated in substantially real-time. As discussed herein, QAP server 110 provides PSR testing. According to embodiments, QAP server 110 acts as a wrapper over performance testing module 250, which executes performance testing, including load testing and PSR testing. Load testing comprises sending a large number of regressions to an application and monitoring the response from the application. PSR testing comprises calculation of a performance baseline and response times and labeling the response from the application at various loads. Performance testing module 250 comprises a test plan that may be configured to execute test case references in a test case file for a predefined number of iterations and for a predefined number of concurrent users. After PSR testing is completed, QAP server 110 may generate one or more reports and accompanying graphics and charts. At the end of PSR testing, QAP server 110 may generate a report by leveraging response times for each step in each test case scenario along with various graphical representations which can be used for analysis of potential performance issues. This framework eliminates creation and maintenance of a test plan for each product separately and a load testing report helps immediately and easily identify any performance bottlenecks.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of quality assurance and performance testing of supply chain applications and systems, comprising:
   a computer comprising a processor, memory, and one or more testing components; and
   a database, communicatively coupled with the computer, and comprising one or more testing application programming interfaces;

wherein the computer is configured to:
  establish a performance baseline of an application by executing a predefined set of workflows under an expected load on a server to generate and measure one or more metrics directed to performance, scalability and reliability;
  provide a user interface for receiving a test case file that describes one or more actions to be tested and a properties file that maps one or more elements to one or more values, wherein the test case file comprises a test case name element, an action type element, a selector element, a value element, and a dataset element, the selector element comprising an attribute name that locates a web element;
  translate a received test case file and a corresponding properties file into a test case;
  execute the test case by identifying the one or more actions identified in the test case and automatically invoking one or more testing components configured to execute a test using the one or more actions; and
  replicate an issue by executing the test case repeatedly over a period of time to simulate a time period over which the issue occurs, wherein the issue is caused by a combination of factors that take place during the time period.

2. The system of claim 1, wherein at least one of the one or more testing components is configured to test a web-based application.

3. The system of claim 2, wherein at least one of the one or more testing components is configured to test an OS-based application.

4. The system of claim 3, wherein the computer is further configured to:
  generate a predefined list of one or more action types identifying one or more user interactions with one or more of the web-based application and the OS-based application.

5. The system of claim 4, wherein the value element comprises a value matched against a specified selector and the dataset comprises an input for an input element.

6. The system of claim 5, wherein one or more values for the selector element, the value element and the dataset are expressed in a properties file as key=value pairs.

7. A computer-implemented method for quality assurance and performance testing of supply chain applications and systems, comprising:
  establishing, by a computer, a performance baseline of an application by executing a predefined set of workflows under an expected load on a server to generate and measure one or more metrics directed to performance, scalability and reliability;
  providing, by the computer, a user interface for receiving a test case file that describes one or more actions to be tested and a properties file that maps one or more elements to one or more values, wherein the test case file comprises a test case name element, an action type element, a selector element, a value element, and a dataset element, the selector element comprising an attribute name that locates a web element;
  translating, by the computer, a received test case file and a corresponding properties file into a test case;
  executing, by the computer, the test case by identifying the one or more actions identified in the test case and automatically invoking one or more testing components configured to execute a test using the one or more actions; and
  replicating, by the computer, an issue by executing the test case repeatedly over a period of time to simulate a time period over which the issue occurs, wherein the issue is caused by a combination of factors that take place during the time period.

8. The method of claim 7, wherein at least one of the one or more testing components is configured to test a web-based application.

9. The method of claim 8, wherein at least one of the one or more testing components is configured to test an OS-based application.

10. The method of claim 9, further comprising:
  generating, by the computer, a predefined list of one or more action types identifying one or more user interactions with one or more of the web-based application and the OS-based application.

11. The method of claim 10, wherein the value element comprises a value matched against a specified selector and the dataset comprises an input for an input element.

12. The method of claim 11, wherein one or more values for the selector element, the value element and the dataset are expressed in a properties file as key=value pairs.

13. A non-tangible computer-readable medium embodied with software, the software when executed configured to:
  establish a performance baseline of an application by executing a predefined set of workflows under an expected load on a server to generate and measure one or more metrics directed to performance, scalability and reliability;
  provide a user interface for receiving a test case file that describes one or more actions to be tested and a properties file that maps one or more elements to one or more values, wherein the test case file comprises a test case name element, an action type element, a selector element, a value element, and a dataset element, the selector element comprising an attribute name that locates a web element;
  translate a received test case file and a corresponding properties file into a test case;
  execute the test case by identifying the one or more actions identified in the test case and automatically invoking one or more testing components configured to execute a test using the one or more actions; and
  replicate an issue by executing the test case repeatedly over a period of time to simulate a time period over which the issue occurs, wherein the issue is caused by a combination of factors that take place during the time period.

14. The non-tangible computer-readable medium of claim 13, wherein at least one of the one or more testing components is configured to test a web-based application.

15. The non-tangible computer-readable medium of claim 14, wherein at least one of the one or more testing components is configured to test an OS-based application.

16. The non-tangible computer-readable medium of claim 15, wherein the software when executed is further configured to
  generate a predefined list of one or more action types identifying one or more user interactions with one or more of the web-based application and the OS-based application.

17. The non-tangible computer-readable medium of claim 16, wherein the value element comprises a value matched against a specified selector and the dataset comprises an input for an input element.

18. The non-tangible computer-readable medium of claim 17, wherein one or more values for the selector element, the value element and the dataset are expressed in a properties file as key=value pairs.

* * * * *